US010803167B1

United States Patent
Stanev et al.

(10) Patent No.: US 10,803,167 B1
(45) Date of Patent: Oct. 13, 2020

(54) SYSTEMS AND METHODS FOR EXECUTING APPLICATION LAUNCHERS

(71) Applicant: Symantec Corporation, Mountain View, CA (US)

(72) Inventors: Radoslav Stanev, Tehachapi, CA (US); Jonathon Salehpour, Upland, CA (US); Somard Kruayatidee, Culver City, CA (US)

(73) Assignee: NortonLifeLock, Inc., Tempe, AZ (US)

( * ) Notice: Subject to any disclaimer, the term of this patent is extended or adjusted under 35 U.S.C. 154(b) by 226 days.

(21) Appl. No.: 15/899,384

(22) Filed: Feb. 20, 2018

(51) Int. Cl.
*G06F 21/00* (2013.01)
*G06F 21/53* (2013.01)
*G06F 21/57* (2013.01)
*G06F 21/54* (2013.01)

(52) U.S. Cl.
CPC .............. *G06F 21/53* (2013.01); *G06F 21/54* (2013.01); *G06F 21/577* (2013.01); *G06F 2221/033* (2013.01)

(58) Field of Classification Search
CPC ................................ G06F 21/53; G06F 21/577
USPC .......................................................... 726/22
See application file for complete search history.

(56) References Cited

U.S. PATENT DOCUMENTS

| 9,111,089 | B1 | 8/2015 | Bhatia et al. |
| 9,876,896 | B1 * | 1/2018 | Gailloux ........... H04M 1/72577 |
| 10,146,517 | B2 * | 12/2018 | Lim ........................ G06F 21/51 |
| 2006/0021029 | A1 | 1/2006 | Brickell et al. |
| 2017/0053314 | A1 * | 2/2017 | Glover ............... G06Q 30/0267 |
| 2019/0362067 | A1 | 11/2019 | Salehpour et al. |

FOREIGN PATENT DOCUMENTS

| GB | 2492857 A | 1/2013 |
| WO | 2013/015968 A1 | 1/2013 |
| WO | 2019/226228 A1 | 11/2019 |

OTHER PUBLICATIONS

Velmurugan Sengottaian, Easy App Locker [EAL], https://play.google.com/store/apps/details?id=app.vel.murugan.easyapplocker.
Salehpour, J., "Systems and Methods for Controlling an Application Launch Based on a Security Policy," co-pending U.S. Appl. No. 15/985,734, filed May 22, 2018.
Salehpour, Jonathon, "Systems and Methods for Providing Persistent Visual Warnings for Application Launchers", U.S. Appl. No. 16/542,060, filed Aug. 15, 2019, 69 pages.

(Continued)

*Primary Examiner* — Longbit Chai
(74) *Attorney, Agent, or Firm* — FisherBroyles, LLP

(57) ABSTRACT

The disclosed computer-implemented method for executing application launchers may include (i) creating a security sandbox within an operating system environment, (ii) executing an original application launcher within the security sandbox, and (iii) registering the security sandbox as a new application launcher within the operating system environment such that the original application launcher is still available to a user through the security sandbox and the security sandbox supplements the original application launcher by providing a layer of protection for the user. Various other methods, systems, and computer-readable media are also disclosed.

20 Claims, 7 Drawing Sheets

(56) References Cited

OTHER PUBLICATIONS

International Search Report and Written received for PCT Application Serial No. PCT/US2019/024115 dated Jun. 4, 2019, 11 pages.
Anonymous, "[APP] GO Launcher 1.1.3 released.", URL: http://forum.xda-developers.com/showthread.php?t=857269, Android Development and Hacking, Dec. 17, 2010, pp. 1-7.

* cited by examiner

SYSTEMS AND METHODS FOR EXECUTING APPLICATION LAUNCHERS

BACKGROUND

In some modern mobile device environments, a user's primary interaction with their mobile device is through the application launcher. As used herein, an application launcher may include any application that assists a user in locating and executing other applications. Illustrative examples of application launchers may include GOOGLE NOW and SAMSUNG TOUCHWIZ.

In view of the above, if a security vendor could control an application launcher, then the security vendor could control how the user is interacting with their mobile device. The security vendor could thereby provide better protection from threats such as malware and network intrusions. Unfortunately, a security vendor must invest in a large amount of development, within a highly competitive marketplace, to develop its own application launcher. Moreover, users are often reluctant to change application launchers if the users are already satisfied with the existing application launchers on their mobile devices. The instant disclosure, therefore, identifies and addresses a need for improved systems and methods for executing application launchers.

SUMMARY

As will be described in greater detail below, the instant disclosure describes various systems and methods for executing application launchers. In one example, a computer-implemented method for sandboxing application launchers may include (i) creating a security sandbox within an operating system environment, (ii) executing an original application launcher within the security sandbox, (iii) registering the security sandbox as a new application launcher within the operating system environment such that the original application launcher is still available to a user through the security sandbox, and the security sandbox supplements the original application launcher by providing a layer of protection for the user.

In one embodiment, the security sandbox is configured to obey a set of rules that the operating system environment imposes on applications to register as a new application launcher. In one embodiment, the security sandbox substantially omits any application launcher functionality beyond that provided by the original application launcher.

In one embodiment, the original application launcher may include one of a factory default application launcher provided by the operating system environment and a third-party substitute application launcher that the user downloaded. In one embodiment, the security sandbox inherits at least some application launcher functionality of the original application launcher.

In some examples, registering the security sandbox as the new application launcher within the operating system environment enables the security sandbox to: (i) intercept an attempted action to be performed by the original application launcher, (ii) apply a security policy against the attempted action to evaluate whether to allow the attempted action to be performed, and (iii) selectively block the attempted action based on the security policy. In one embodiment, the security sandbox simulates execution of the original application launcher in a non-sandboxed operating system environment.

In one embodiment, the security sandbox includes a set of programming hooks that are located at a location of a file access function for interacting with storage and/or a binder function for interacting with services. In some examples, executing the original application launcher within the security sandbox may include loading the original application launcher into a process space of the security sandbox using a class loader.

In one embodiment, the computer-implemented method may further include (i) creating a proxy activity that serves as a container for the original application launcher, (ii) registering the proxy activity as a home application launcher within the operating system environment, and (iii) upon launching the proxy activity, rebinding the security sandbox to the proxy activity.

In one embodiment, a system for implementing the above-described method may include (i) a creation module, stored in memory, that creates a security sandbox within an operating system environment, (ii) an execution module, stored in memory, that executes an original application launcher within the security sandbox, (iii) a registration module, stored in memory, that registers the security sandbox as a new application launcher within the operating system environment such that the original application launcher is still available to a user through the security sandbox and the security sandbox supplements the original application launcher by providing a layer of protection for the user, and (iv) at least one physical processor configured to execute the creation module, the execution module, and the registration module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) create a security sandbox within an operating system environment, (ii) execute an original application launcher within the security sandbox, (iii) register the security sandbox as a new application launcher within the operating system environment such that the original application launcher is still available to a user through the security sandbox, and the security sandbox supplements the original application launcher by providing a layer of protection for the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
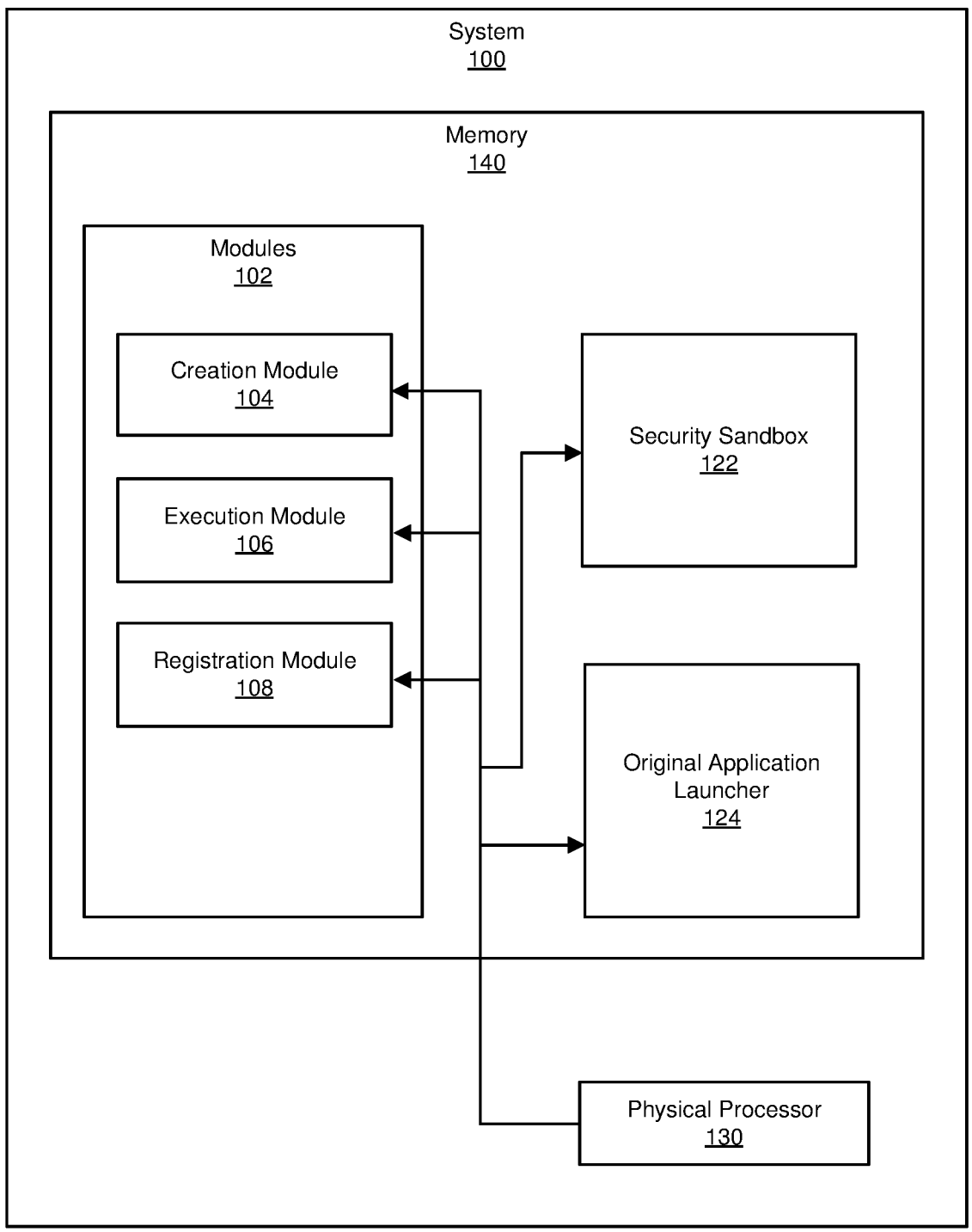
FIG. 1 is a block diagram of an example system for executing application launchers.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for executing application launchers. The disclosed subject matter may improve upon related security systems by obtaining control of an application launcher within an operating system environment. Obtaining control of the application launcher may enable the corresponding security program, such as a security sandbox, to monitor, intercept, and selectively block (or otherwise manage) actions performed by the application launcher. Illustrative examples of these actions may include installing/uninstalling applications, hiding/displaying applications, and allowing/blocking application execution. Moreover, the sandbox-based technique of this application may enable a security vendor to obtain this high level of control, within the operating system environment, without the security vendor financing the full investment to independently create a separate application launcher, as distinct from simply executing a preexisting application launcher within a security sandbox, as discussed further below.

Figure 2:
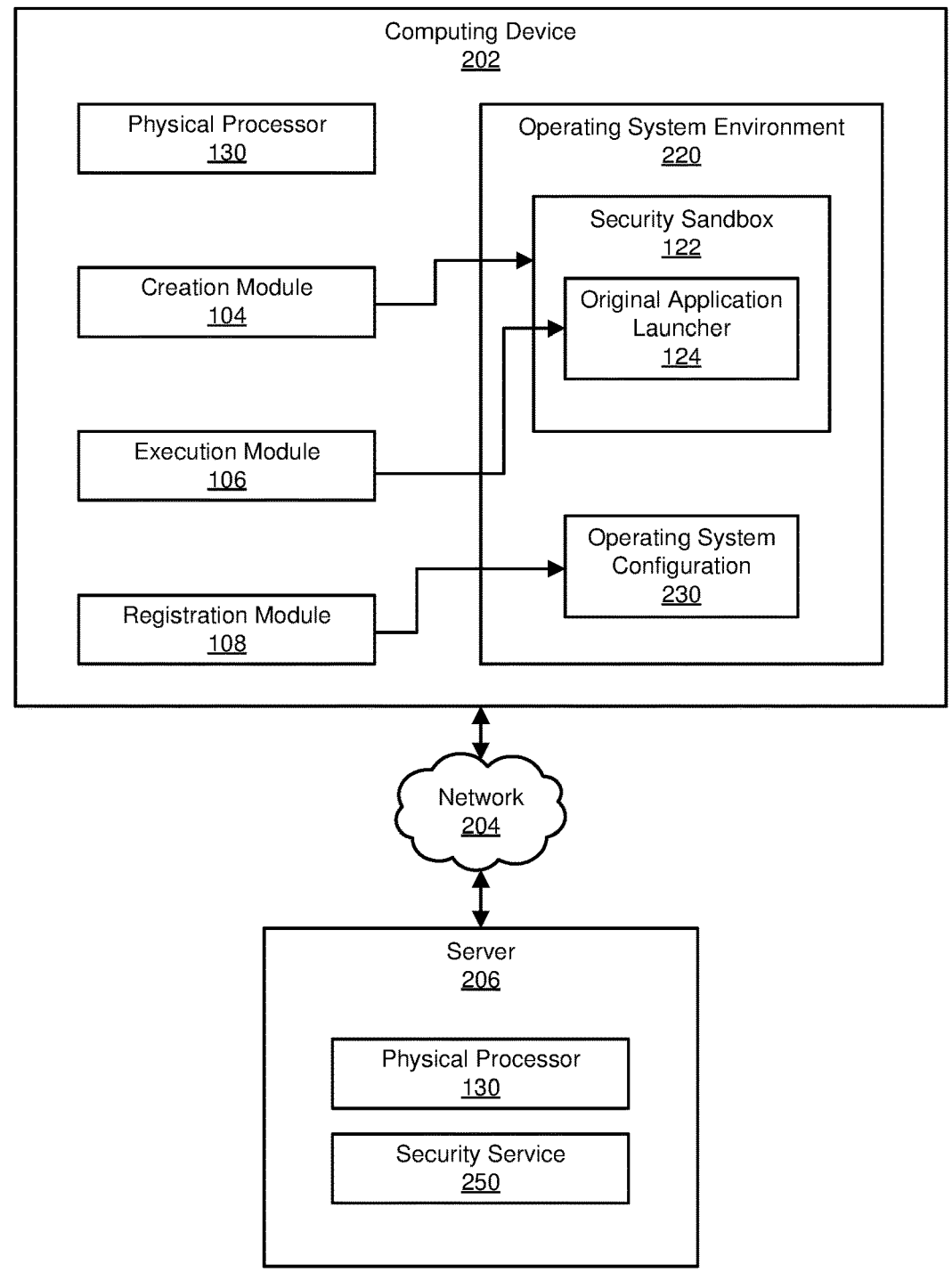
FIG. 2 is a block diagram of an additional example system for executing application launchers.

The following will provide, with reference to FIGS. 1-2, detailed descriptions of example systems for executing application launchers. Detailed descriptions of corresponding computer-implemented methods will also be provided in connection with FIGS. 3-5. In addition, detailed descriptions of an example computing system and network architecture capable of implementing one or more of the embodiments described herein will be provided in connection with FIGS. 6 and 7, respectively.

FIG. 1 is a block diagram of example system 100 for sandboxing application launchers. As illustrated in this figure, example system 100 may include one or more modules 102 for performing one or more tasks. For example, and as will be explained in greater detail below, example system 100 may include a creation module 104 that creates a security sandbox, such as a security sandbox 122, within an operating system environment. Example system 100 may additionally include an execution module 106 that executes an original application launcher, such as an original application launcher 124, within the security sandbox. Example system 100 may also include a registration module 108 that registers the security sandbox as a new application launcher within the operating system environment such that the original application launcher is still available to a user through the security sandbox and the security sandbox supplements the original application launcher by providing a layer of protection for the user. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate executing application launchers. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system.

As will be described in greater detail below, one or more of modules 102 from FIG. 1 may, when executed by at least one processor of computing device 202 and/or server 206, enable computing device 202 and/or server 206 to execute application launchers. For example, and as will be described in greater detail below, creation module 104 may create security sandbox 122 within an operating system environment 220. Execution module 106 may execute original application launcher 124 within security sandbox 122. Registration module 108 may register security sandbox 122 as a new application launcher within operating system environment 220, by modifying an operating system configuration 230, such that original application launcher 124 is still available to a user through security sandbox 122 and security sandbox 122 supplements original application launcher 124 by providing a layer of protection for the user.

In addition to the above, FIG. 2 also shows how computing device 202 may interact with server 206, which may correspond to a backend security server of a security vendor such as SYMANTEC. In some examples, the security vendor may provide a security service 250 through server 206. In more specific examples, the user may download security sandbox 122, or a corresponding installer for security sandbox 122, from the security vendor through security service 250.

Computing device 202 generally represents any type or form of computing device capable of reading computer-executable instructions. In one illustrative example, computing device 202 may include a modern smartphone mobile device. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of performing method 300, or facilitating the performance of method 300, as discussed further below in connection with FIG. 3. Illustrative examples of server 206 may include a backend security server of a security vendor, as further discussed above. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
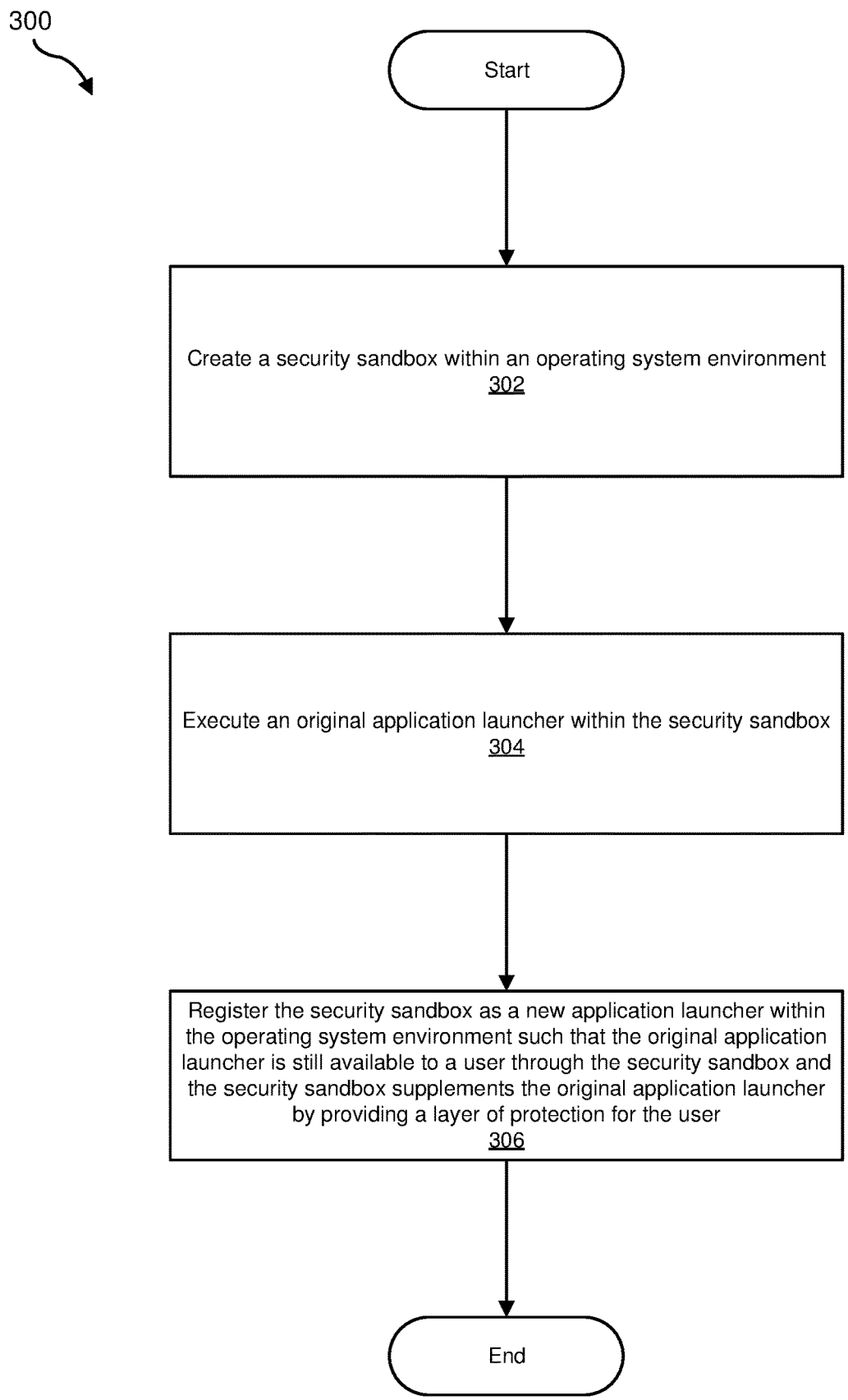
FIG. 3 is a flow diagram of an example method for executing application launchers.

FIG. 3 is a flow diagram of an example computer-implemented method 300 for executing application launchers. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may create a security sandbox within an operating system environment. For example, creation module 104 may, as part of computing device 202 in FIG. 2, create security sandbox 122 within operating system environment 220.

As used herein, the term "security sandbox" generally refers to an application that wraps, surrounds, encapsulates, monitors, or manages an underlying application, such as an underlying original application launcher, using sandbox technology according to computer science. In some illustrative examples, the security sandbox may execute the underlying application within its own process space, thereby enabling the security sandbox to monitor, intercept, and/or potentially modify behavior of the underlying application, as distinct from the underlying application executing within its own independent process space.

Moreover, as used herein, the term "operating system environment" generally refers to the environment of a corresponding operating system. In some examples, the operating system environment may refer to an operating system environment of a mobile device, such as a smartphone. Illustrative examples of operating system environments may include the ANDROID operating system environment and the APPLE IPHONE operating system environment.

Creation module 104 may create the security sandbox within the operating system environment in a variety of ways. In some examples, the security sandbox may be configured to obey a set of rules that the operating system imposes on applications to register as a new application launcher. For example, the operating system may specify that, in order to register as an application launcher within the operating system environment, a corresponding application must first set a flag that designates the application as an application launcher. The operating system may also specify that, in order to register as an application launcher within the operating system environment, a corresponding application must be configured in a manner that satisfies one or more security policies, which may protect a user from unsafe behavior by application launchers.

In some examples, the security sandbox may omit some, or all, application launcher functionality beyond that provided by the original application launcher. As used herein, the term "application launcher functionality" generally refers to functionality that an application launcher, as further defined above, performs as part of locating and/or executing underlying applications for a user. In contrast, the security sandbox may supplement the original application launcher with functionality that performs one or more security actions, as distinct from performing application launcher functionality. As used herein, the term "security action" generally refers to any action that the security sandbox may perform to protect a user from a corresponding computing system, or computing network, security threat, such as a malware, virus, intrusion, exfiltration, and/or privacy invasion threat. Some illustrative examples of the security action performed by the security sandbox may include blocking, inhibiting, throttling, and/or delaying performance of a corresponding application launcher function, which may include installing, executing, and/or displaying an underlying application.

In view of the above, the disclosed subject matter may improve upon related systems by eliminating a need for a developer of the security sandbox to invest in the substantial development of an independent application launcher, as distinct from simply leveraging the functionality of the original application launcher within the security sandbox. In other words, the disclosed subject matter may benefit a security vendor, when developing the security sandbox, by enabling the security vendor to focus development resources on the security actions performed by the security sandbox (e.g., monitoring, intercepting, and/or selectively blocking, inhibiting, or otherwise altering behavior of the original application launcher), rather than expending these development resources on independently recreating one or more application launcher functions that the original application launcher already performs. Of course, although the security vendor made benefit from avoiding the recreation of all, or substantially all, of the application launcher functionality provided by the original application launcher, the security vendor may also optionally recreate some or all of this application launcher functionality within the security sandbox.

In some examples, the security sandbox may optionally include a set of programming hooks that are located at a location of (i) a file access function for interacting with storage and/or (ii) a binder function for interacting with services. In other words, the security sandbox may include programming hooks that enable the security sandbox to monitor how the original application launcher, which is executing within the security sandbox, is attempting to access storage (e.g., primary storage or secondary storage within the operating system environment). Additionally, the security sandbox may monitor how the original application launcher is attempting to access other services provided by the operating system environment or applications executing within the operating system environment. Additionally or alternatively, the security sandbox may also optionally include a set of programming hooks that are located at a location of (iii) functions for executing installed packages and/or (iv) functions for enumerating installed packages. Furthermore, in more specific examples the security sandbox may optionally include a set of programming hooks that are located at a location of the start of a function that (a) is located at a higher level of programming abstraction, or nested execution, than one or more (i.e., any permutation) of the functions (i)-(iv) listed above while also (b) including, or calling, one or more of these functions.

In general, the security sandbox may inject one or more of these function hooks into its own process. One or more of the hooks may be strategically placed at a location of some, or all, inter-process-communication (IPC) related functions, such as binders, sockets, etc. One or more of the hooks may also be placed at a location of input/output functions, such as file-system input/output functions. The injection of these hooks may provide the security sandbox with full control over interactions between the original application launcher and the remainder of the operating system environment.

Additionally or alternatively, injecting one or more of the hooks into the security sandbox may ensure that an indication of the nature of the security sandbox is not leaked outside to the operating system environment. Some mobile device operating systems, such as the ANDROID OPERATING system, may include one or more mechanisms to detect undesirable application behavior, which is behavior defined by the operating system as bad, such as one application masquerading as a different application. These mechanisms may terminate an application upon detecting that it is masquerading as another application. Accordingly, the disclosed systems and methods may ensure that the nature of the security sandbox is concealed from the outside operating system environment. For example, execution module 106 (and/or another one of modules 102) may, as part of the security sandbox, intercept system calls to prevent the leak of a target application identifier. Execution module 106 may perform this step by swapping a package name, a user identifier, etc., with a parallel identifier that corresponds to the security sandbox. From the perspective of the outside operating system environment, only a single application is making calls to the operating system, and that single application is the security sandbox.

At step 304, one or more of the systems described herein may execute an original application launcher within the security sandbox. For example, execution module 106 may, as part of computing device 202 in FIG. 2, execute original application launcher 124 within security sandbox 122. As used herein, the term "original application launcher" simply refers to any application launcher that was previously registered as an application launcher within a corresponding operating system environment, as discussed above, prior to the original application launcher being placed within the security sandbox at step 304. In other words, the modifier "original" in the term "original application launcher" simply indicates that the original application launcher was previously registered within the operating system environment as an application launcher prior to being placed within the security sandbox (e.g., prior to the security sandbox replacing the original application launcher as the application launcher registered within the operating system environment).

In some examples, the original application launcher may include a factory application provided by the operating system environment. In other examples, the original application launcher may include a third-party substitute application launcher that the user downloaded. In other words, in some examples the operating system environment may provide an application launcher for the user "out of the box" when the user first purchases the corresponding computing device, such as a smartphone mobile device. Additionally, after first purchasing the corresponding computing device, and opening at "out of the box," the user may also later install one or more third-party substitute application launchers. In some examples, the user may install the third-party substitute application launcher in a manner that effectively replaces the factory application provided by the operating system environment. In other examples, the user may install the third-party substitute application launcher in a manner that simply supplements the original application launcher without replacing or deleting the original application launcher. Accordingly, as used herein, the term "substitute" simply refers to the user retaining the option to use the third-party substitute application launcher instead of the original application launcher. In some examples, the user may maintain a multitude of different application launchers installed and available within the operating system environment. Illustrative examples of application launchers may include GOOGLE NOW and SAMSUNG TOUCHWIZ. The user may optionally download one or more third-party substitute application launchers from a mobile device application marketplace platform, such as GOOGLE PLAY.

In some examples, the security sandbox may inherit at least some application launcher functionality of the original application launcher. In general, the security sandbox may be installed, and/or registered, within the operating system environment such that the security sandbox inherits all, or substantially all, of the application launcher functionality of the original application launcher, as discussed below in more detail in connection with step 306. Furthermore, in these examples the security sandbox may leverage sandboxing technology, in accordance with the computing science of application sandboxing, to enable one or more user requests or commands to "pass through" to the underlying original application launcher. In other words, the security sandbox may be positioned as an intermediary between the user and the original application launcher. Accordingly, the security sandbox may enable the user to interact with the original application launcher in a conventional manner (i.e., as if the security sandbox was not present), with the exception (e.g., the only exception) that the security sandbox may intervene to block, throttle, inhibit, alter, and/or deviate from the conventional functionality of the original application launcher whenever the security sandbox determines that this functionality would violate or trigger one or more security policies, as further discussed above. In some examples, the security sandbox may only intervene when one or more security policies are violated, thereby ensuring that substantially all of the application launcher functionality of the original application launcher remains available to the user using the security sandbox as an intermediary.

In some examples, the security sandbox may simulate execution of the original application launcher in a non-sandboxed operating system environment. In other words, the security sandbox may have a level of, or layer of, invisibility to the user such that the security sandbox presents the original application launcher to the user in a manner that entirely, or substantially, preserves the original appearance, graphical user interface, and interactive functionality of the original application launcher. Accordingly, in these examples, the security sandbox may create the illusion that the application launcher is executing within a non-sandboxed operating system environment. From the perspective of the user (i.e., a user unaware that the security sandbox had been installed, registered, and/or executed), the original application launcher would appear to execute in a conventional manner, outside of a security sandbox, except when that functionality would violate one or more security policies, as discussed above. In contrast, from the perspective of the operating system environment, the security sandbox itself would be installed as the application launcher registered with the operating system environment (or at least one of the application launchers registered with the operating system environment). In some examples, the security sandbox may be installed, and registered, as the application launcher associated with the "home," default, and/or main screen of the operating system environment, including mobile operating system environments such as GOOGLE ANDROID.

In further examples, execution module 106 may execute the security sandbox at least in part by loading the original application launcher into a process space of the security sandbox. In some of these examples, execution module 106 may load the original application launcher into the process space of the security sandbox by using a class loader. In one illustrative example, the class loader may include DexClassLoader according to the GOOGLE ANDROID operating system environment. In other examples, execution module 106 may load the original application launcher into the process space of the security sandbox by creating a proxy activity (e.g., a stub activity) within the operating system environment. Additionally, registration module 108 may further register the stub activity as an application launcher within the operating system environment (e.g., as a primary, default, or "home screen" application launcher). In these examples, execution module 106 may later replace the stub activity with a main screen, or home screen, activity of the original application launcher. The proxy activity may serve, or function, as a container for the original application launcher. Furthermore, in these examples, the term "activity" generally refers to a programming module that defines, in terms of a graphical user interface, how a program, such as an application launcher, will interact with a user at a particular state associated with the activity (e.g., a beginning or home screen activity, or an activity associated with user interaction that may occur later after the user navigates away from the home screen or start screen of the corresponding application).

At step 306, one or more of the systems described herein may register the security sandbox as a new application launcher within the operating system environment such that the original application launcher is still available to a user through the security sandbox and the security sandbox supplements the original application launcher by providing a layer of protection for the user. For example, registration module 108 may, as part of computing device 202 in FIG. 2, register security sandbox 122 as a new application launcher within operating system environment 220 such that original application launcher 124 is still available to a user through security sandbox 122 and security sandbox 122 supplements original application launcher 124 by providing a layer of protection for the user.

As used herein, the phrase "register the security sandbox as a new application launcher" generally refers to switching the security sandbox to a state of being registered as an application launcher within the operating system environment, whereas previously the security sandbox was not registered as such. Moreover, as used herein, the phrase "register the security sandbox as a new application launcher" generally refers to the operating system establishing settings, configurations, and/or procedures for distinguishing between launcher applications and non-launcher applications, such that the security sandbox may be registered by the appropriate modification or application of these settings, configurations, and/or procedures.

Similarly, as used herein, the phrase "the original application launcher is still available to a user through the security sandbox" generally refers to the security sandbox enabling input/output to pass through between the user and the original application launcher, in accordance with sandboxing technology, such that the user maintains access to at least some of the application launcher functionality provided by the original application launcher. In some illustrative examples, the user may maintain access to all of the application launcher functionality provided by the original application launcher, except to the extent that this application launcher functionality is modified or blocked according to a security policy applied by the security sandbox. For example, the user may maintain the ability to locate and execute an underlying application, through the original application launcher, except in the case that the specific action of locating and/or executing this application would violate a corresponding security policy applied by the security sandbox.

In some examples, registering the security sandbox as the new application launcher within the operating system environment may enable the security sandbox to perform one or more functions. For example, upon registration, the security sandbox may supplement the original application launcher with a layer of protection to protect the user. The layer of protection may correspond to the availability of one or more security functions, including monitoring, intercepting, and/or blocking functions, as further discussed above. In general, the security sandbox in these examples may intercept an attempted action to be performed by the original application launcher. Examples of these attempted actions may include installing/uninstalling one or more applications, executing/blocking execution of one or more applications, and/or hiding/displaying the availability of one or more applications. Upon intercepting the attempted action, the security sandbox may apply a security policy against the attempted action to evaluate whether to allow the attempted action to be performed. The security policy may include any security policy that checks whether a corresponding attempted action by the original application launcher is predicted to be safe for the user. Illustrative examples of the security policy may include a whitelist/blacklist of applications that are permitted/forbidden and/or security policies that analyze application behavior to detect one or more instances of malicious or suspect behavior. Upon detecting that the attempted action by the original application launcher is predicted to be unsafe, the security sandbox may selectively block the attempted action based on the security policy.

Figure 4:
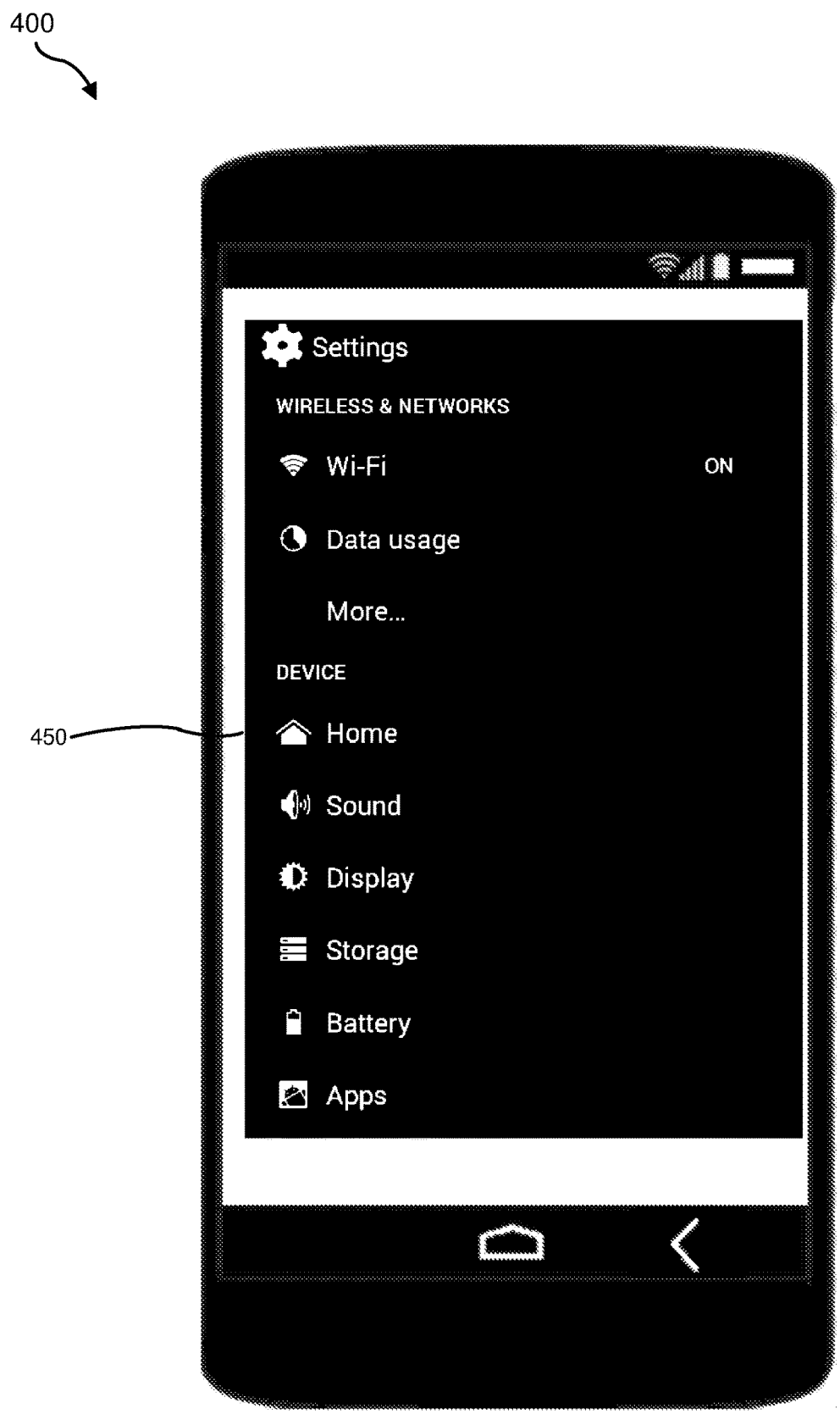
FIG. 4 is a block diagram of an example smartphone display.

FIG. 4 is a block diagram of an example smartphone graphical user interface 400. In this example, a user may have entered the settings portion of an operating system environment, such as the ANDROID OPERATING system environment. Furthermore, according to this example, a user may select a "home" icon 450. Selection of icon 450 may enable a user to select an application launcher that controls, or is assigned to, the home screen (e.g., default or primary screen) for the operating system environment.

Figure 5:
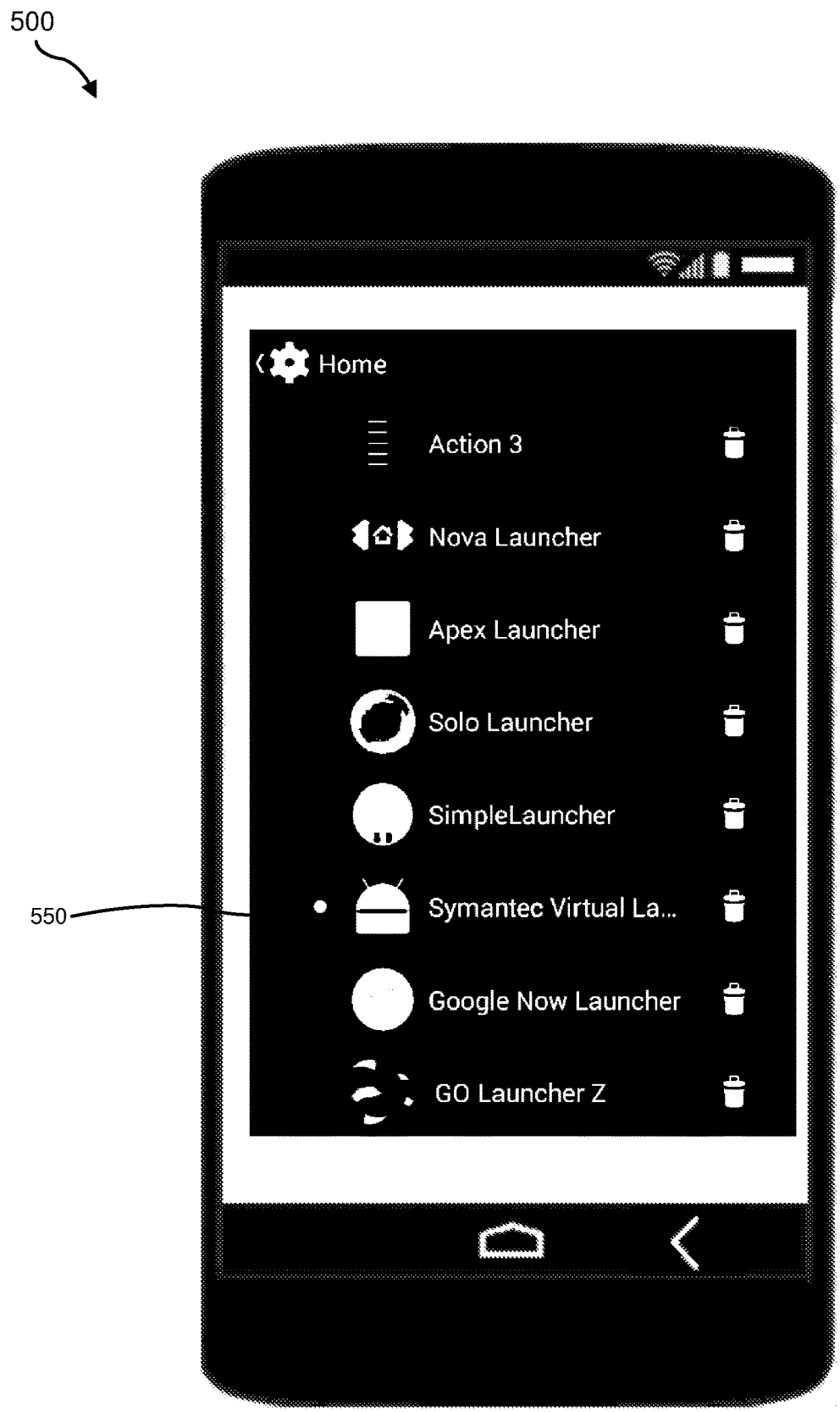
FIG. 5 is a block diagram of an example smartphone display.

FIG. 5 shows another block diagram of an example smartphone graphical user interface 500. After the user selects icon 450, the operating system environment may display a list of available application launchers. These application launchers may have been installed into the operating system environment in the past. In this example, the list of application launchers includes "SYMANTEC VIRTUAL LAUNCHER," which may correspond to the security sandbox of method 300 of FIG. 3. Accordingly, the user may select another icon 550, which may further designate that "SYMANTEC VIRTUAL LAUNCHER" is registered as the home, default, and/or primary application launcher for the operating system environment. In other words, the security sandbox may take control of the functionality of the home screen for the operating system environment.

The above discussion provides an overview of the disclosed subject matter in connection with FIG. 3 of this application. Additionally, the following discussion provides a supplemental overview of concrete embodiments of the disclosed subject matter.

Illustrative points of novelty include the following. First, the disclosed subject matter may control a user's launcher without modification to the actual launcher itself using a sandboxing technique. Second, the specific procedure for placing an application launcher within a sandbox may improve upon related systems.

A sandboxed (or sub-sandboxed) launcher may include an application, which from a point of view of the operating system is viewed as a valid application launcher (e.g., a valid ANDROID application launcher). In other words, the application launcher may obey some, or all, of the rules that the operating system establishes, and imposes, upon application launchers. However, at the same time, the sandboxing launcher (e.g., the security sandbox) may not implement some, or any, traditional functionality of an application launcher. As a matter of fact, the application launcher may optionally carry no additional application launcher functionality whatsoever. Instead, the security sandbox only carries capabilities to place an original application launcher (e.g., the default application launcher on a user's device or a third-party application launcher that the user has chosen to download) within the security sandbox, thereby providing the security sandbox with monitoring, intervention, and/or control powers over the original application launcher.

In essence, the security sandbox is able to "morph" itself into the original application launcher. When placing the original application launcher within the security sandbox, the security sandbox optionally inherits some or all of the original application launcher functionality. Additionally, the security sandbox may intercept any of the original application launcher's flows. Furthermore, the security sandbox may also modify any of the original application launcher's functionality. The hooks and behavior modification effectively grant full control, or almost full control, over the user's interaction with the device. In some examples, the security sandbox may hide or display applications, block or unblock applications, alter the appearance of applications, interrupt the starting of an application, and/or place an application that the original application launcher launches within the security sandbox (e.g., "sub-sandboxing"), thereby applying sub-sandboxing capabilities and features to the underlying applications, in addition to placing the original application launcher within the security sandbox.

In one specific and concrete example, a user may select "SYMANTEC VIRTUAL LAUNCHER" as the home screen launcher. However, the disclosed subject matter may actually place the original application launcher (e.g., the APUS launcher) within the security sandbox. The disclosed subject matter may then launch the original application launcher within the process space of the security sandbox (e.g., "SYMANTEC VIRTUAL LAUNCHER"). From the perspective of the user, it appears that the original application launcher is executing. From the perspective of the operating system environment, however, it appears that the security sandbox is executing. This configuration enables the disclosed subject matter to obtain full control over the original application launcher. For example, the security sandbox may hide applications, block applications from running, etc.

At a high level of abstraction, the disclosed subject matter may create a security sandbox and execute the original application launcher within the security sandbox. The disclosed subject matter may register the security sandbox as the user's new application launcher within the operating system environment. From the perspective of the operating system, it will appear as if the security sandbox is the currently executing application launcher. Accordingly, the operating system environment will provide the security sandbox with all of the benefits that are allocated to application launchers registered within the operating system. However, since the security sandbox is executing the original application launcher, it will appear from the perspective of the user that the original application launcher is still executing. Illustrative examples of the original application launcher may include GOOGLE NOW and SAMSUNG TOUCHWIZ.

Placing the original application launcher within the security sandbox may first involve the creation of the security sandbox. On the ANDROID operating system, this can be accomplished in two steps, as discussed below. First, the disclosed subject matter may identify and inject key hook points where the security sandbox interacts with the operating system environment. On ANDROID, hook points may optionally be placed within two primary locations: file-related functions for interacting with storage and binder-related functions for interacting with services. These hooks may optionally be placed into the process that is going to serve as the security sandbox. Second, the disclosed subject matter may load the original application launcher within a process, or process space, of the security sandbox. One approach for accomplishing this is to use a class loader, such as DexClassLoader within the ANDROID OPERATING system environment, to load the original application launcher into the process space. A discussion of an alternative method, which may have some advantages over the "class loader" method, is also provided below. Third, with the hooks in place, the security sandbox can observe and potentially intercept any functionality performed by the original application launcher. These functions may include starting services, activities, content providers, etc.

In some examples, there may be additional steps involved to create a nested sandbox of an original application launcher, as distinct from placing a conventional application (i.e., a non-launcher application) within a sandbox. These additional steps may be performed due to the fact that the original application launcher is actually created and owned by the operating system environment itself. One illustrative example of these additional steps is described below.

First, the disclosed subject matter may create an empty, stub, or proxy activity that will serve as the "container" for the original application launcher. This container activity may optionally omit any logic or user interface code. The containing activity will eventually be "replaced" at run-time with the primary activity for the original application launcher.

Second, the disclosed subject matter may register the proxy activity as a "home" launcher so that the system recognizes this activity as an application launcher. This will enable the user to select this activity as a home screen application launcher.

Third, when the proxy activity gets notified (via the activity's onCreate method) that the proxy activity is being displayed, the disclosed subject matter may attempt to "re-bind" the security sandbox to the original application launcher. As mentioned before, other sandboxing applications may optionally use a class loader (e.g., DexClassLoader) to perform the "re-binding." In contrast, this example implementation (i.e., in terms of the proxy activity) may use a cleaner and more robust approach, which is to hook the ActivityThread and intercept the BIND_APPLICATION message.

Fourth, after the application has been bound, the disclosed subject matter may replace the proxy activity with the original application launcher's primary activity.

Figure 6:
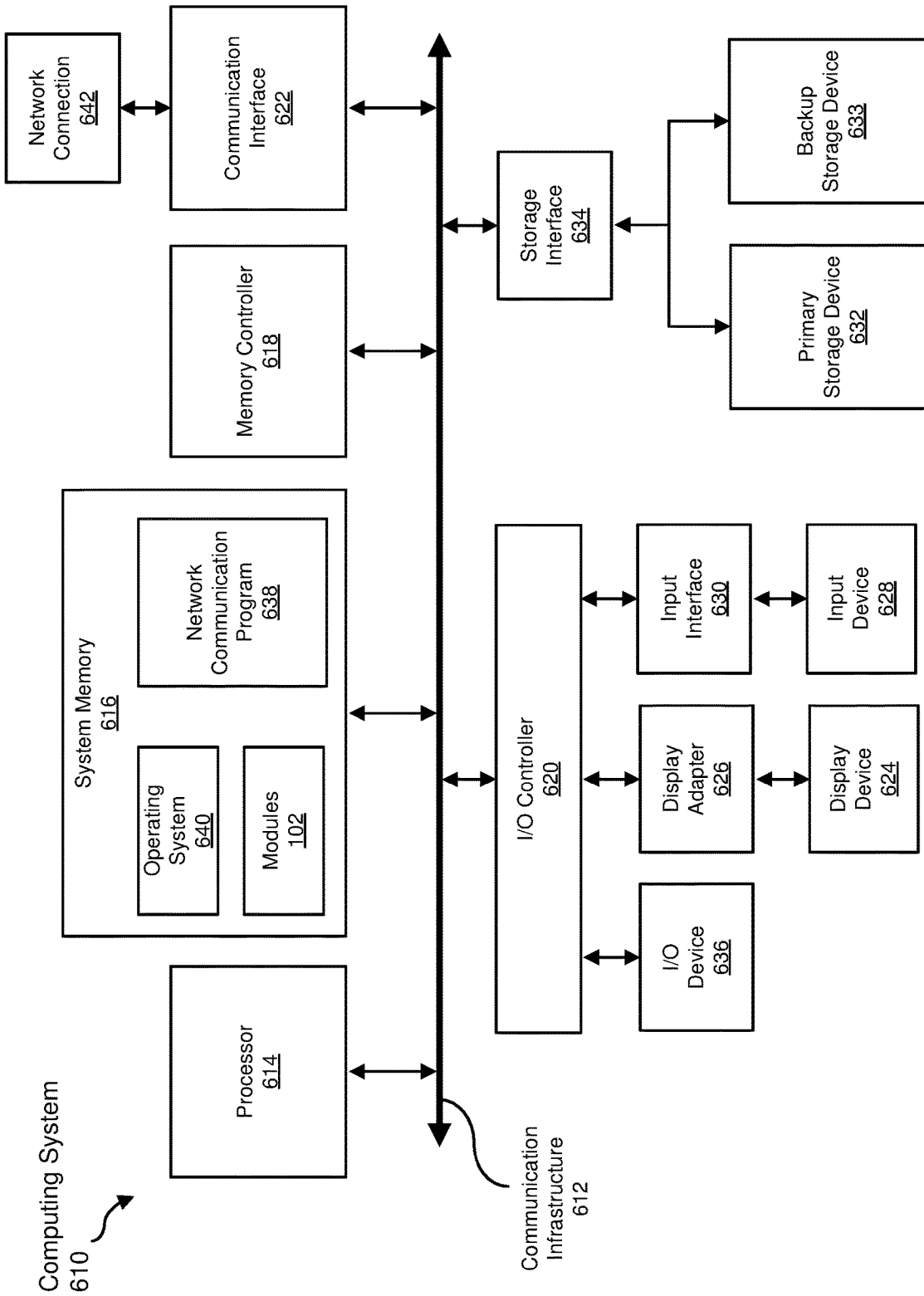
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
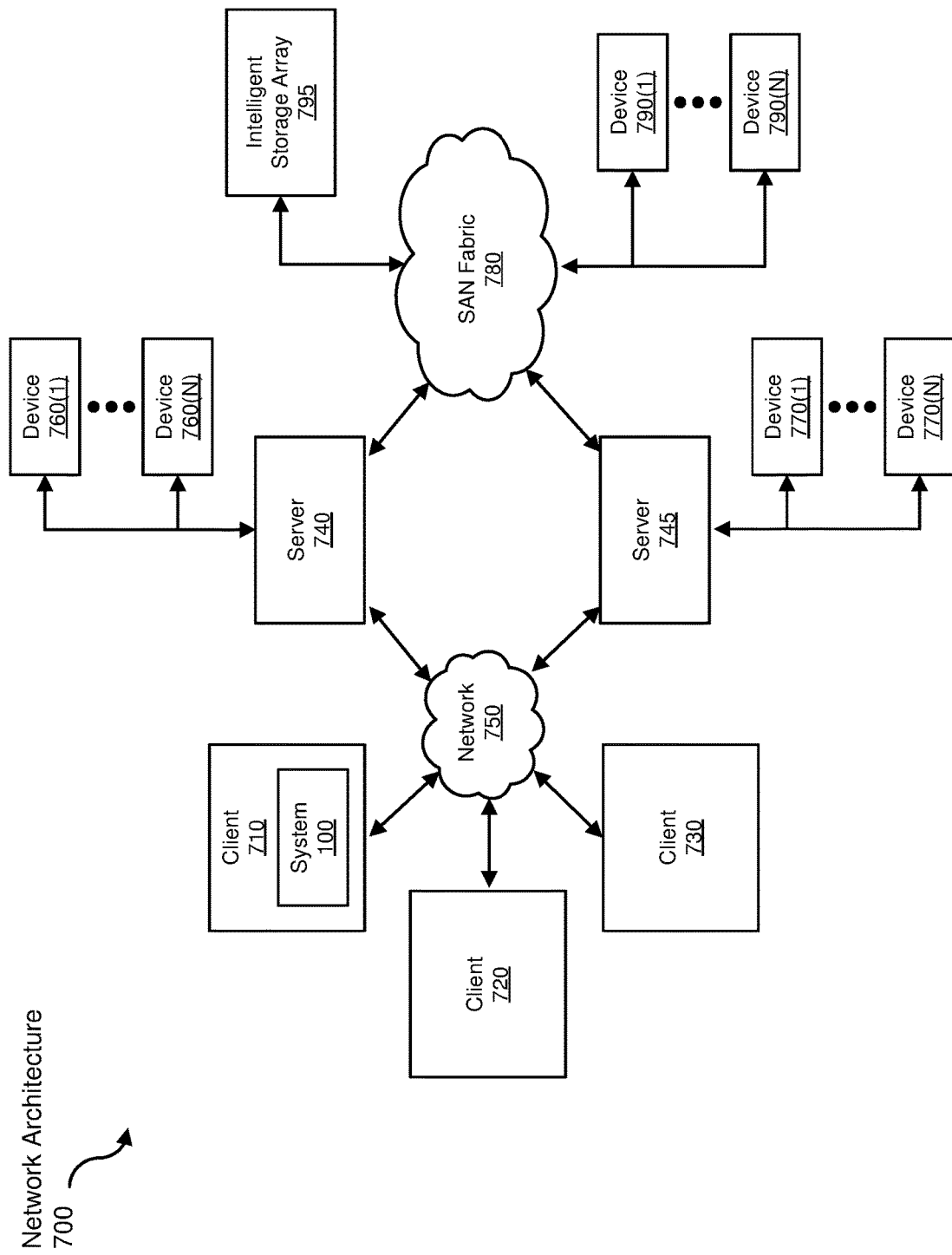
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for executing application launchers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may modify a configuration of an original application launcher by effectively wrapping the original application launcher within a security sandbox, as further discussed above, which may supplement the original application launcher with additional functionality that provides an additional layer of protection for the user. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for executing application launchers, at least a portion of the method being performed by a computing device comprising at least one hardware processor, the method comprising:
   creating a security sandbox within an operating system environment, wherein the security sandbox is configured to intercept system calls by swapping a package name with an identifier that corresponds to the security sandbox so as to conceal the security sandbox from an outside of the operating system environment and prevent a leakage of a target application identifier;
   executing an original application launcher within the security sandbox; and
   registering the security sandbox as a new application launcher within the operating system environment such that:
      the original application launcher is still available to a user through the security sandbox; and
      the security sandbox supplements the original application launcher by providing a virtualization layer of protection for the user that overlays from the operating system environment by controlling the original application launcher executing in the security sandbox and performing a security action distinct from functionality of the original application launcher.

2. The computer-implemented method of claim 1, wherein the security sandbox is configured to obey a set of rules that the operating system environment imposes on applications to register as a new application launcher.

3. The computer-implemented method of claim 1, wherein the security sandbox substantially omits any application launcher functionality beyond that provided by the original application launcher.

4. The computer-implemented method of claim 1, wherein the original application launcher comprises one of:
   a factory default application launcher provided by the operating system environment; and
   a third-party substitute application launcher that the user downloaded.

5. The computer-implemented method of claim 1, wherein the security sandbox inherits at least some application launcher functionality of the original application launcher.

6. The computer-implemented method of claim 1, wherein registering the security sandbox as the new application launcher within the operating system environment enables the security sandbox to:
   intercept an attempted action to be performed by the original application launcher;
   apply a security policy against the attempted action to evaluate whether to allow the attempted action to be performed; and
   selectively block the attempted action based on the security policy.

7. The computer-implemented method of claim 1, wherein the security sandbox simulates execution of the original application launcher in a non-sandboxed operating system environment.

8. The computer-implemented method of claim 1, wherein the security sandbox includes a set of programming hooks that are located at a location of at least one of:
   a file access function for interacting with storage; and
   a binder function for interacting with services.

9. The computer-implemented method of claim 1, wherein executing the original application launcher within the security sandbox comprises loading the original application launcher into a process space of the security sandbox using a class loader.

10. The computer-implemented method of claim 1, further comprising:
   creating a proxy activity that serves as a container for the original application launcher;
   registering the proxy activity as a home application launcher within the operating system environment; and
   upon launching the proxy activity, rebinding the security sandbox to the proxy activity.

11. A system for sandboxing application launchers, the system comprising:
   a creation module, stored in memory, that creates a security sandbox within an operating system environment, wherein the security sandbox is configured to intercept system calls by swapping a package name with an identifier that corresponds to the security sandbox so as to conceal the security sandbox from an outside of the operating system environment and prevent a leakage of a target application identifier;
   an execution module, stored in memory, that executes an original application launcher within the security sandbox;
   a registration module, stored in memory, that registers the security sandbox as a new application launcher within the operating system environment such that:
      the original application launcher is still available to a user through the security sandbox; and
      the security sandbox supplements the original application launcher by providing a virtualization layer of protection for the user that overlays from the operating system environment by controlling the original application launcher executing in the security sandbox and performing a security action distinct from functionality of the original application launcher; and
   at least one physical processor configured to execute the creation module, the execution module, and the registration module.

12. The system of claim 11, wherein the security sandbox is configured to obey a set of rules that the operating system environment imposes on applications to register as a new application launcher.

13. The system of claim 11, wherein the security sandbox substantially omits any application launcher functionality beyond that provided by the original application launcher.

14. The system of claim 11, wherein the original application launcher comprises one of:
   a factory default application launcher provided by the operating system environment; and
   a third-party substitute application launcher that the user downloaded.

15. The system of claim 11, wherein the security sandbox inherits at least some application launcher functionality of the original application launcher.

16. The system of claim 11, wherein the registration module registers the security sandbox as the new application launcher within the operating system environment in a manner that enables the security sandbox to:

intercept an attempted action to be performed by the original application launcher;
apply a security policy against the attempted action to evaluate whether to allow the attempted action to be performed; and
selectively block the attempted action based on the security policy.

17. The system of claim 11, wherein the security sandbox simulates execution of the original application launcher in a non-sandboxed operating system environment.

18. The system of claim 11, wherein the security sandbox includes a set of programming hooks that are located at a location of at least one of:
a file access function for interacting with storage; and
a binder function for interacting with services.

19. The system of claim 11, wherein the execution module executes the original application launcher within the security sandbox by loading the original application launcher into a process space of the security sandbox using a class loader.

20. A non-transitory computer-readable medium comprising one or more computer-readable instructions that, when executed by at least one hardware processor of a computing device, cause the computing device to:

create a security sandbox within an operating system environment, wherein the security sandbox is configured to intercept system calls by swapping a package name with an identifier that corresponds to the security sandbox so as to conceal the security sandbox from an outside of the operating system environment and prevent a leakage of a target application identifier;
execute an original application launcher within the security sandbox; and
register the security sandbox as a new application launcher within the operating system environment such that:
the original application launcher is still available to a user through the security sandbox; and
the security sandbox supplements the original application launcher by providing a virtualization layer of protection for the user that overlays from the operating system environment by controlling the original application launcher executing in the security sandbox and performing a security action distinct from functionality of the original application launcher.

* * * * *